(12) United States Patent
Adams et al.

(10) Patent No.: US 10,476,851 B1
(45) Date of Patent: Nov. 12, 2019

(54) UNBOUNDED SESSIONS FOR SECURE COMMUNICATIONS

(71) Applicant: Centri Technology, Inc., Seattle, WA (US)

(72) Inventors: William Joseph Adams, Everett, WA (US); Luis Gerardo Paris, Maple Valley, WA (US); Aldo Jose Nunez, Seattle, WA (US)

(73) Assignee: Centri Technology, Inc., Seattle, WA (US)

( * ) Notice: Subject to any disclaimer, the term of this patent is extended or adjusted under 35 U.S.C. 154(b) by 0 days.

(21) Appl. No.: 15/967,474

(22) Filed: Apr. 30, 2018

(51) Int. Cl.
*H04L 29/06* (2006.01)
*G06F 21/60* (2013.01)

(52) U.S. Cl.
CPC ........ *H04L 63/0428* (2013.01); *G06F 21/602* (2013.01); *G06F 21/606* (2013.01); *H04L 63/0435* (2013.01); *H04L 63/0442* (2013.01)

(58) Field of Classification Search
CPC . H04L 63/042; H04L 63/0428; G06F 21/602; G06F 21/606
See application file for complete search history.

(56) References Cited

U.S. PATENT DOCUMENTS

| 5,784,566 A | * | 7/1998 | Viavant | H04L 63/0428 709/229 |
| 6,438,367 B1 | * | 8/2002 | Crawford | H04L 63/0428 370/203 |
| 7,216,230 B2 | * | 5/2007 | Suzuki | H04L 63/0428 713/151 |
| 8,850,200 B1 | * | 9/2014 | Horgan | H04L 63/0428 709/201 |
| 2001/0056546 A1 | * | 12/2001 | Ogilvie | G06F 21/6209 726/26 |

* cited by examiner

Primary Examiner — Nam T Tran
(74) Attorney, Agent, or Firm — John W. Branch; Lowe Graham Jones PLLC

(57) ABSTRACT

Embodiments are directed towards encoding and transmitting data over a homogeneous network, heterogeneous network or without a network using secure sessions. An application generates a payload that includes information associated with the application and a another application. An encoding engine obtains a session bundle and the payload from the application. A message package that includes an encoded version of the payload such that the payload may be encoded based on the session bundle and the payload. The message package may be provided to the application. The application may select a communication facility to send the message package to the other application. The other application employs its communication facility to receive the message package from the application. The decoding engine may decode the message package based on a second session bundle. The decoding engine may provide the payload of the decoded message package to the other application.

30 Claims, 11 Drawing Sheets

UNBOUNDED SESSIONS FOR SECURE COMMUNICATIONS

TECHNICAL FIELD

These innovations relate generally to encoding and decoding of data, and more particularly, but not exclusively, to establishing secure communications channels independent of underlying infrastructure and networks.

BACKGROUND

The advent of the digital age has brought along a myriad of interconnected devices and a plethora of applications that communicate over various networks in various networking environments. The variability in networking technology, communication protocols, security protocols, or the like, continues to increase. Some communication applications may have requirements that may be ill-served by standard protocols or networking environment. Also, in some cases, relying on other service providers to enforce communication security may be disadvantageous for critical applications. Thus, it is with respect to these considerations and others that the subject innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
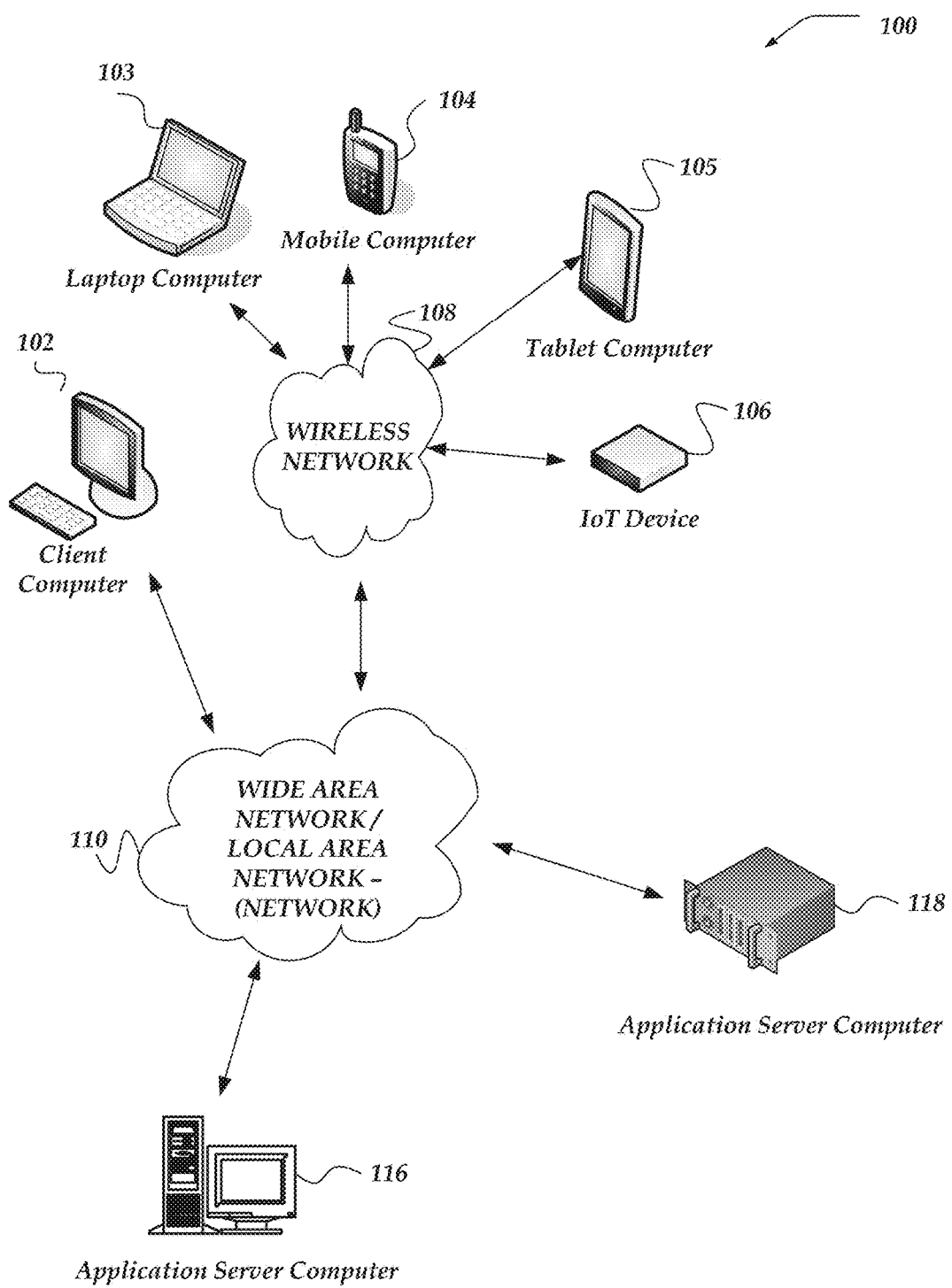
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms, "encoding," and "decoding," refer to cryptographic operations that may be performed on data. Generally, encoding may refer to one or more cryptographic operations that may be performed on data to secure it for transmission and/or storage. In some cases, data may be encoded using public key/private key cryptography. In other cases, cryptographic operations may employ symmetric keys. Further, in some embodiments, operations such as compression or decompression may be employed before and/or after data is encoded or decoded. Accordingly, herein it is assumed that encoding, decoding, and cryptographic operations may include one or more additional steps such as compression, decompression, data padding, data seeding, or the like, or combination thereof.

As used herein "encoding engine" refers to an engine that is arranged to perform one or more data encoding operations. Encoding operations may include encryption, compression, or the like. Also, encoding engines may be arranged to perform one or more supporting operations, such as, executing cryptographic hash functions, providing random numbers (e.g., pseudo-random numbers or real-random numbers), cryptographic key management, generating shared secrets, cryptographic signing, cryptographic authentication, cipher negotiation, cipher management, or the like, or combination thereof. In some embodiments, an encoding engine may support more than one cipher suite. In some cases, the cipher suites employed by an encoding engine may be well-known or otherwise standards based. In other cases, cipher suites may include custom operations. Further, in some cases, encoding engines that support custom cipher suites may employ one or more well-known or standards based cryptographic operations (e.g., SHA2 hashing, or the like) as part of the custom cipher suite.

As used herein "decoding engine" refers to an engine that is arranged to perform one or more data decoding operations. Generally, the above definition for encoding engine applies to decoding engines except that decoding engine are designed to produce decoded data from encoded data. Further, in some cases, an encoding engine and a decoding engine may be part of the same engine or application. In other cases, the encoding engine and decoding engine may be separate from each other.

As used herein the term, "session parameters" refers to one or more parameters that may define one or more characteristics of pending or impending session. Typically, an application will provide a desired set of session parameters to an encoding engine before a secure session is established. In some cases, the actual session parameters used for a secure session may be arrived at by a negotiation phase of a handshake protocol used to establish the secure session. Session parameters may include various parameters, such as, session duration/time-outs, package size-limits, transaction count limits, preferred cipher suites, required cipher suites, one or more cipher parameters, key size constraints, key exchange protocol preferences/requirements, keep-alive preferences/requirements, time-out grace periods, or the like, or combination thereof. Applications may provide session parameters encoding engines or decoding engines using APIs, setting configuration files, or the like. Also, one or more session parameter values may be set using one or more "default" values built in to encoding engines or decoding engines, provided via configuration information, or the like.

As used herein the term, "handshake package" refers to data exchanged between application endpoints while conducting a handshake protocol to establish a secure session. Encoding engines or decoding engines may generate handshake packages that may be exchanged to establish a secure session. Handshake packages carry the information necessary for two sides of a session to identify, authenticate, or validate each other. Also, handshake packages may be used to exchange session parameters, secrets, keying information, keys, or the like, as part of the handshake protocol. The specific format and contents of handshake packages may depend on the requirements of a particular secure session, including the type of cipher or cipher suite being used in a given secure session.

As used herein the term, "session metadata" refers to information used to conduct a secure session. Generally, session metadata is cryptographically relevant information that is used by encoding engines or decoding engines to encode or decode data. The session metadata is stored or managed by the applications that employ encoding engines or decoding engines. The session metadata may be provided to an encoding engine to encode data and to a decoding engine to decode encoded data. Session metadata includes information necessary for performing cryptographic operations for ciphers used during a secure session. This may include cryptographic keys, or the like. Session metadata may also include metadata that may be used to enforce one or more session parameters or provide diagnostic information. Session metadata is generated separately for each endpoint of a secure session and each secure session may have its own unique session metadata.

As used herein the term, "secure session" refers to a virtual secure communication channel between at least two endpoints, usually two applications, such as, a client application and a server application, or the like. Generally, if a handshake protocol is successful, a secure session may be established. An individual secure session is associated with session metadata that corresponds to that secure session. Secure sessions are virtual or ephemeral in nature and not required to be associated with a particular network connection or transport protocol. An established secure session may remain 'open' or 'established' even when the network(s) or communication is interrupted or closed down for an (extended) period of time.

As used herein the term, "application payload" refers to data that an application provides to an encoding engine to be encoded for a secure session. Likewise, application payloads may be generated when decoding engines decode encoded data. Application payload includes information or data that is relevant only to the applications communicating via a secure session. The content or purpose of application payloads generally is meaningless to encoding engines or decoding engines. They simply encode or decode the data handed to them.

As used herein the term, "message package" refers to data that has been encoded by an encoding engine for use with a secure session. Application payloads provided to an encoding engine are encoded into message packages. Message packages provided to a decoding engine are decoded into application payloads.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to encoding data over one or more networks. In one or more of the various embodiments, a first application may be instantiated to perform various actions, including, generating a payload that includes information associated with the first application and a second application. In one or more of the various embodiments, the first application may perform actions, including, instantiating an encoding engine to perform various actions. In one or more of the various embodiments, the first application may perform actions, including, providing one or more session parameters to the encoding engine. In one or more of the various embodiments, the first application may perform actions, including, obtaining a handshake package from the encoding engine, wherein the handshake package is based on one or more session parameters. In one or more of the various embodiments, the first application may perform actions, including, selecting the one or more communication facility from the plurality of communication facilities. In one or more of the various embodiments, the first application may perform actions, including, employing the one or more communication facility to send the handshake package to the second application.

In one or more of the various embodiments, the first application may perform actions, including, obtaining a response handshake package from the second application. In one or more of the various embodiments, the first application may perform actions, including, providing the response handshake package to the encoding engine. And, in one or more of the various embodiments, the first application may perform actions, including, receiving the first session bundle from the encoding engine such that the first session bundle is based on the response handshake package and one or more session parameters.

In one or more of the various embodiments, the encoding engine may perform actions, including, obtaining a first session bundle and the payload from the first application such that the first session bundle corresponds to a secure session.

In one or more of the various embodiments, the encoding engine may perform actions, including, generating a message package that includes an encoded version of the payload such that the payload may be encoded based on the first session bundle and the payload.

In one or more of the various embodiments, the encoding engine may perform actions, including, providing the message package to the first application.

In one or more of the various embodiments, the first application may perform actions, including, selecting one or more of a plurality of communication facilities available to the first application to send the message package to the second application such that two or more types of the communication facilities provide different modes of communication over different types of communication media.

In one or more of the various embodiments, the second application may be instantiated to perform various actions.

In one or more of the various embodiments, the second application may perform actions, including, providing the handshake package to the decoding engine. In one or more of the various embodiments, the second application may perform actions, including, receiving a response handshake package and the second session bundle from the decoding engine such that the response handshake package and the second session bundle are based on the handshake package and one or more session parameters. In one or more of the various embodiments, the second application may perform actions, including, selecting the one or more communication facilities available to the second application from the plurality of communication facilities. In one or more of the various embodiments, the second application may perform actions, including, employing the one or more communication facilities available to the second application to send the response handshake package to the first application.

In one or more of the various embodiments, the second application may perform actions, including, providing one or more second session parameters. In one or more of the various embodiments, the second application may perform actions, including, obtaining one or more first session parameters from the decoding engine based on a handshake package provided by the first application. In one or more of the various embodiments, the second application may perform actions, including, comparing the one or more first session parameters to the one or more second session parameters. And, in one or more of the various embodiments, the second application may perform actions, including, accepting the handshake package based on an affirmative result of the comparison.

In one or more of the various embodiments, the second application may perform actions, including, employing one or more of the plurality of communication facilities that are available to the second application to receive the message package from the first application. In one or more of the various embodiments, the second application may perform actions, including, instantiating a decoding engine to perform various actions. In one or more of the various embodiments, the second application may perform actions, including, obtaining a handshake package from the first application.

In one or more of the various embodiments, the decoding engine may perform actions, including, decoding the message package based on a second session bundle that is associated with the secure session.

In one or more of the various embodiments, the decoding engine may perform actions, including, comparing the message package with the second session bundle. And, in one or more of the various embodiments, the decoding engine may perform actions, including, rejecting the message package based on a negative result of the comparison, wherein the payload is discarded and the secure session is terminated.

In one or more of the various embodiments, the decoding engine may perform actions, including, providing the payload of the decoded message package to the second application.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-106, application server computer 116, application server computer 118, or the like.

At least one embodiment of client computers 102-106 is described in more detail below in conjunction with FIG. 2. In one embodiment, at least some of client computers 102-106 may operate over one or more wired or wireless networks, such as networks 108, or 110. Generally, client computers 102-106 may include virtually any computer capable of communicating over a network to send and receive information, perform various online activities, offline actions, or the like. In one embodiment, one or more of client computers 102-106 may be configured to operate within a business or other entity to perform a variety of services for the business or other entity. For example, client computers 102-106 may be configured to operate as a web server, firewall, client application, media player, mobile telephone, game console, desktop computer, internet of things (IoT) devices, or the like. However, client computers 102-106 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102, or the like, may include computers that typically connect using a wired or wireless communications medium such as personal computers, multiprocessor systems, microprocessor-based or programmable electronic devices, network PCs, sensors, or the like. In some embodiments, client computers 102-106 may include virtually any portable computer capable of connecting to another computer and receiving information such as, laptop computer 103, mobile computer 104, tablet computers 105, interne of thing (IoT) devices, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-106 typically range widely in terms of capabilities and features. Moreover, client computers 102-106 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-106 also may include at least one other client application that is configured to receive or send content between another computer. The client application may include a capability to send or receive content, or the like. The client application may further provide information that identifies itself, including a type, capability, name, and the like. In one embodiment, client computers 102-106 may uniquely identify themselves through any of a variety of mechanisms, including an Internet Protocol (IP) address, a phone number, Mobile Identification Number (MIN), an electronic serial number (ESN), a client certificate, physical uncloneable function (PUF), or other device identifier. Such information may be provided in one or more network packets, or the like, sent between other client computers, application server computer 116, application server computer 118, or other computers.

Client computers 102-106 may further be configured to include a client application that enables an end-user to log into an end-user account that may be managed by another computer, such as application server computer 116, application server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, application server computer 118, or the like.

Wireless network 108 is configured to couple client computers 103-106 and its components with network 110. Wireless network 108 may include any of a variety of wireless sub-networks that may further overlay stand-alone ad-hoc networks, and the like, to provide an infrastructure-oriented connection for client computers 103-106. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, application server computer 118, client computers 102, and client computers 103-106 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

In one or more of the various embodiments, conventional wired or wireless networks may be absent from the system. Accordingly, in some embodiments, the system may not include any networks whatsoever. In some embodiments, a file system may be used as a common location to exchange data between the client application and the server application. In some embodiments, the client application and server application could use IPC (inter process communication) in addition to or instead of, a network or combination of networks. In some embodiments, an SMS text message/system or email system or database repository may be used as a means to exchange data between the client application and server application. In some embodiments, any combination of networks, lack of networks, IPC, file systems, SMS, text messages, email, database repositories, and other means may be used in or absent from the system.

Also, one embodiment of application server computer 116, application server computer 118 are described in more detail below in conjunction with FIG. 3. Although FIG. 1 illustrates application server computer 116, application server computer 118 each as a single computer, the innovations or embodiments are not so limited. For example, one or more functions of application server computer 116, application server computer 118, or the like, may be distributed across one or more distinct network computers. Moreover, in one or more embodiments, application server computer 116, application server computer 118 may be implemented using a plurality of network computers. Further, in one or more of the various embodiments, application server computer 116, application server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
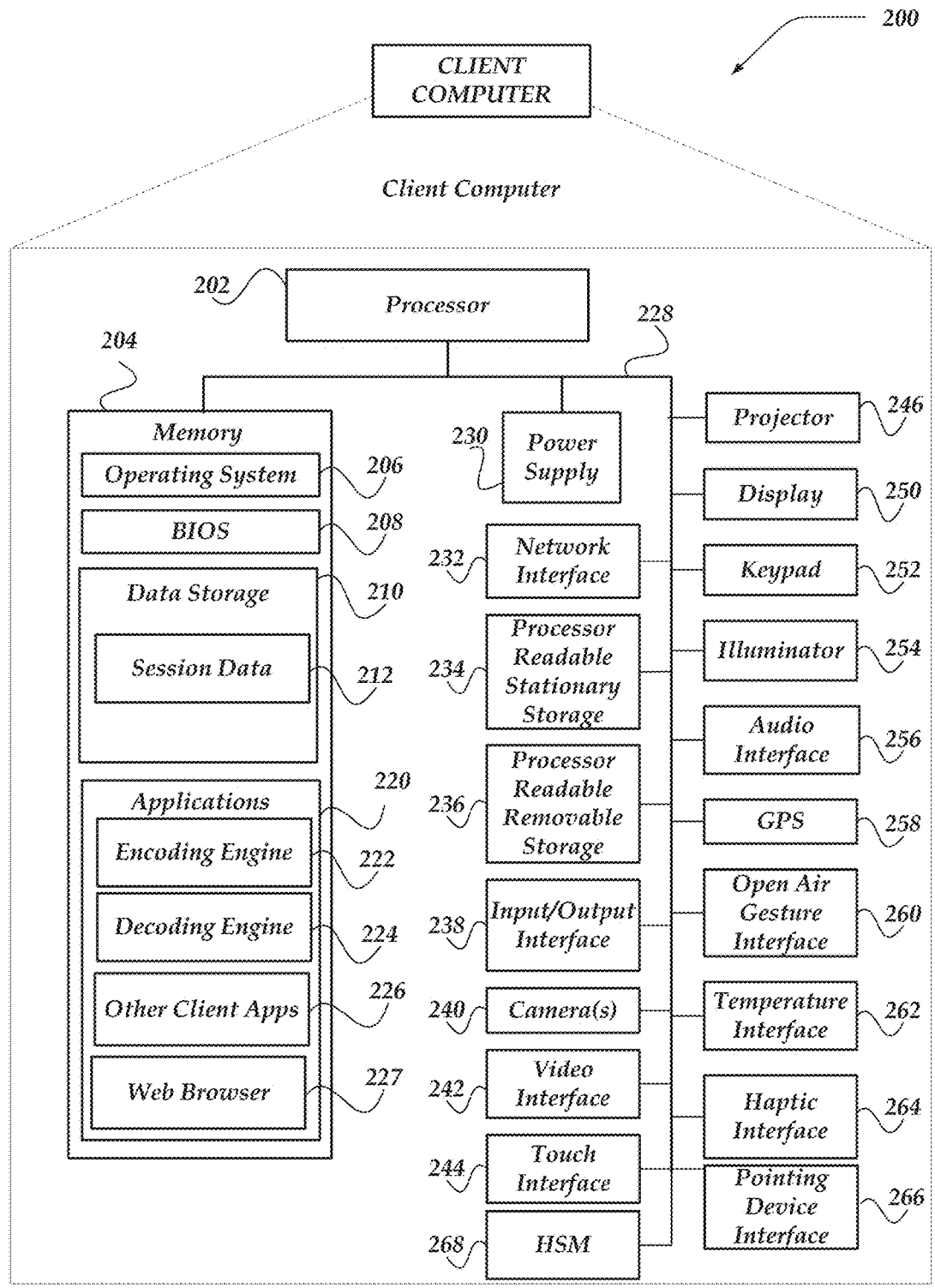
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, cryptographic secrets, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Recommended Standard 232 (RS-232), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, encoding engine 222, decoding engine 224, other client apps 226, web browser 227, or the like, may be arranged to employ geo-location information to select one or more localization features, such as, time zones, languages, currencies, calendar formatting, or the like. Localization features may be used in documents, clauses, evaluators, machine learning models, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 227 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220, session metadata 212, or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, encoding engine 222, decoding engine 224, other client apps 226, web browser 227, or the like. Client computers may be arranged to exchange encoded communications, such as, queries, searches, messages, notification messages, event messages, alerts, performance metrics, log data, or the like, combination thereof, with one or more application server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
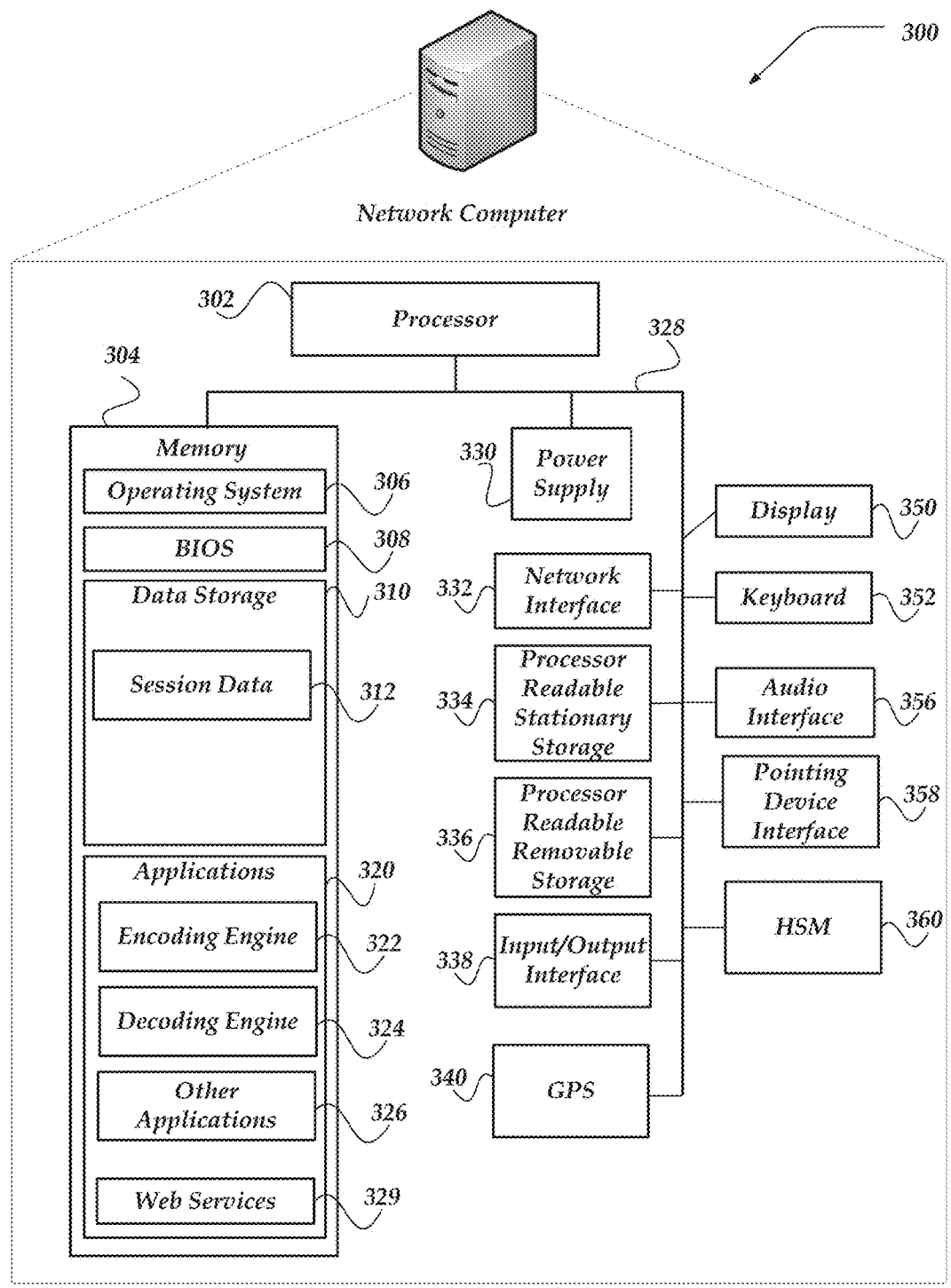
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of application server computer 116, or application server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, encoding engine 322, decoding engine 324, other applications 326, web services 329, or the like, may be arranged to employ geo-location information to select one or more localization features, such as, time zones, languages, currencies, currency formatting, calendar formatting, or the like. Localization features may be used in documents, file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, session metadata 312, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include encoding engine 322, decoding engine 324, other applications 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, encoding engine 322, decoding engine 324, other applications 326, web services 329, or the like, may be operative in a cloud-based computing environment. In one or more of the various embodiments, these applications, and others, that comprise the encoding/decoding engines may be executing within virtual machines or virtual servers that may be managed in a cloud-based based computing environment. In one or more of the various embodiments, in this context the applications or engines may flow from one physical network computer within the cloud-based environment to another depending on performance and scaling considerations automatically managed by the cloud computing environment. Likewise, in one or more of the various embodiments, virtual machines or virtual servers dedicated to encoding engine 322, decoding engine 324, other applications 326, web services 329, or the like, may be provisioned and de-commissioned automatically.

Also, in one or more of the various embodiments, encoding engine 322, decoding engine 324, other applications 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
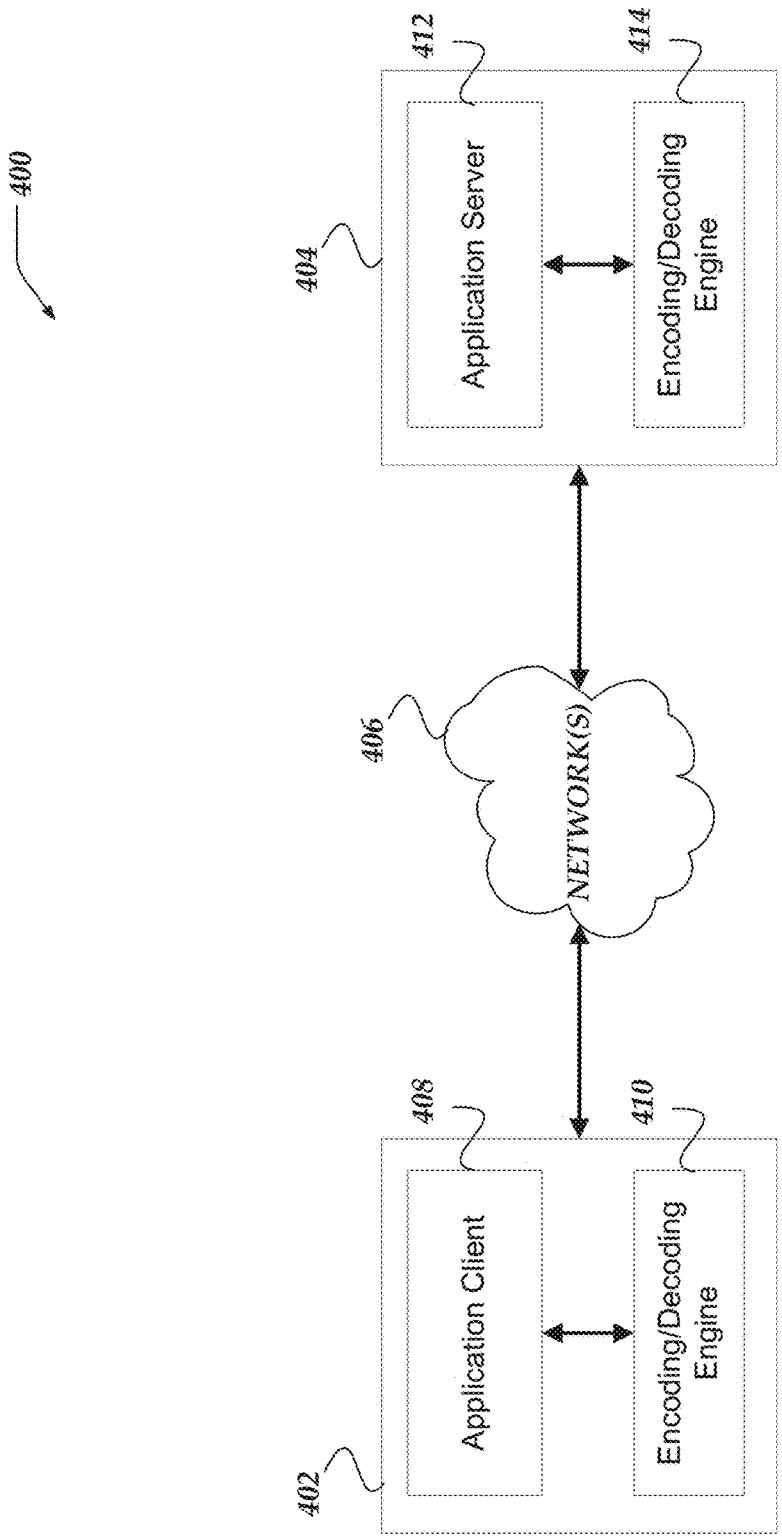
FIG. 4 illustrates a logical representation of a system for unbounded sessions for secure communications in accordance with one or more of the various embodiments.

FIG. 4 illustrates a logical representation of system 400 for providing unbounded sessions for secure communications in accordance with one or more of the various embodiments. In one or more of the various embodiments, system may include network computer 402, network computer 404, or the like, arranged to communicate over network 406.

In one or more of the various embodiments, network computer 402 may include application client 408, encoding/decoding engine 410, or the like. Likewise, in some embodiments, network computer 404 may be arranged to include application server 412, encoding/decoding engine 414, or the like.

In one or more of the various embodiments, application client 408 may be arranged to employ encoding/decoding engine 410 to establish a secure communication session with application server 412. Likewise, in some embodiments, application server 412 may be arranged to employ encoding/decoding engine 414 to participate in the secure communication session with application client 408.

In one or more of the various embodiments, applications, clients or servers, may be arranged to employ encoding engines or decoding engines to establish a secure session that may be separate or in addition to the security features (if any) provided via network 406.

In one or more of the various embodiments, application clients may employ an encoding engine to provide secure message packages by encoding application payloads. The message packages may be communicated to application servers. Accordingly, in some embodiments, the application servers may employ a decoding engine to decode the message packages to provide the application payload for use by the application.

In one or more of the various embodiments, network 406, or other communication methods that enable application client 408 or application server 412 to exchange data may be arranged to perform additional security actions, however, the message packages generated by encoding engines may be secured separately and independently from those additional security actions (if any).

Likewise, in one or more of the various embodiments, if the communication over network 406 is unsecure or otherwise compromised, message packages generated by encoding/decoding engine 410 or encoding/decoding engine 414 may remain secured. This may be because the encoding of the application payload occurs irrespective or independent of the security provided by network 406.

In one or more of the various embodiments, applications may be arranged to select a mechanism or method for communicating handshake packages or message packages to other applications. The particular method may be selected from one or more communication facilities, such as, one or more network interfaces, one or more network protocols, one or more inter-process communication methods (e.g., shared files, shared memory, sockets, or the like), message queues, store-and-forward pipelines, or the like. In some embodiments, two or more different communication facilities may be used to communicate handshake packages or message packages between applications. Likewise, in some embodiments, more than one communication facility may be used to communicate the handshake packages or message packages between applications. In some embodiments, one or more of the communication facilities may include Sneakernet, or user intervention to traverse an air gap. For example, one or more of the communication facilities may include copying a message package to a USB thumb drive which is then carried to another computer that picks up the message package from the USB thumb-drive and continues communicating the message package to its intended destination.

In one or more of the various embodiments, this improves performance of conventional networks because the secure session between application client 408 and application server 412 may be unaffected by changes to network security options or functionality of the underlying networks. For example, if a network provider uses security protocols that do not meet the requirements of the application operators/owners, the encoding/decoding engines may ensure that critical application payloads are secured to a desired protection level.

Further, in one or more of the various embodiments, encoding engines, such as, encoding engine 322, may provide long lived secure sessions that are unaffected by network issues, such as, connection stability, keep-alive schemes (or lack thereof), connection/flow affinity, or the like. For example, because the security of the secure session used by application client 408 and application server 412 are unrelated to the networking or communication protocols used by network 406, the secure session may be maintained even if network connections are dropped or restored. E.g., connection resets may not require a handshake process to restore the secure session. For example, in one or more of the various embodiments, some computers in low power applications may be arranged to power down when idle and then periodically power up to communicate with a server. In this example, the low power computers, may be relieved from having to establish a new secure session with their target endpoint each time they power up. This will improve the performance of the computer by reducing the time and computing resources required to establish a secure connection. Also, secure sessions as disclosed herein will reduce the computing resources required for performing various keep-alive schemes that may prevent conventional secure communication sessions from expiring.

Figure 5:
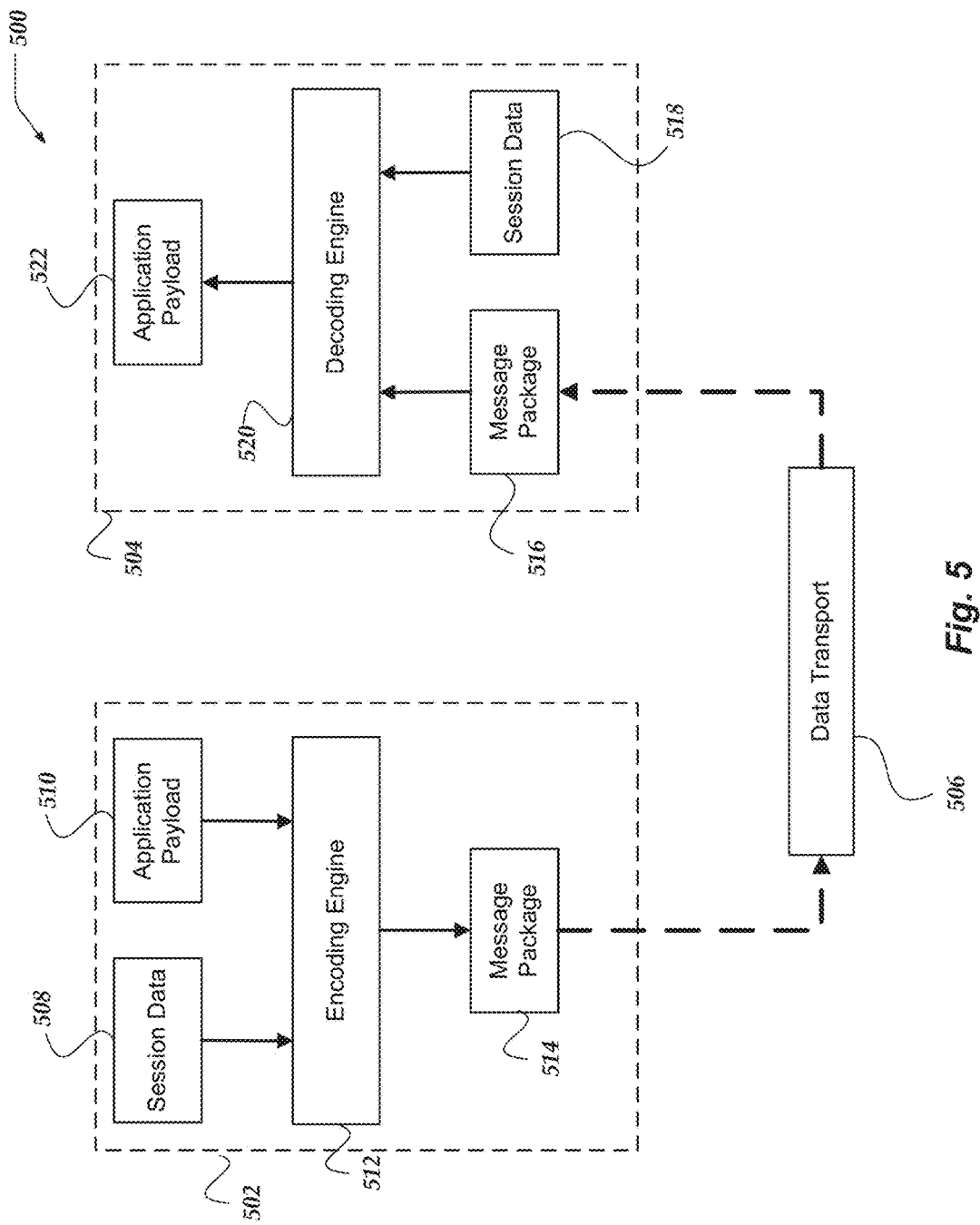
FIG. 5 illustrates a logical schematic of a system for unbounded sessions for secure communications in accordance with one or more of the various embodiments.

FIG. 5 illustrates a logical schematic of system 500 for unbounded sessions for secure communications in accordance with one or more of the various embodiments. In one or more of the various embodiments, an application, such as, application 502, may be arranged to communicate with one or more other applications, such as, application 504 using a data transport facility, such as, data transport 506.

In this example, for one or more of the various embodiments, application 502 may be arranged to provide session metadata 508 and application payload 510 to an encoding engine, such as, encoding engine 512. Accordingly, in one or more of the various embodiments, encoding engine 512 may be arranged to employ session metadata 508 and application payload 510 to generate message package 514. In one or more of the various embodiments, encoding engine 512 may be arranged to generate message package 514 and provide it to application 502. Accordingly, in one or more of the various embodiments, application 502 may use data transport 506 to communicate the message package to application 504.

In one or more of the various embodiments, application 504 may receive message package 516 via data transport 506. In this example, the contents of message package 514 and message package 516 may be the same, however, message package 514 and message package 516 are referenced separately because message package 516 may be a copy of message package 514. Accordingly, in one or more of the various embodiments, application 504 may be arranged to provide message package 516 and session metadata 518 to decoding engine 520 to generate application payload 522 by decoding message package 516. In one or more of the various embodiments, decoding engine 520 may then provide application payload 522 to application 504 for use as intended.

In one or more of the various embodiments, system 500 enables application 502 and application 504 to exchange data securely without coordination or cooperation of other services or systems, such as, other services or systems associated with or comprising data transport 506.

In one or more of the various embodiments, session metadata, such as, session metadata 508 may be generated based on the successful completion of a handshake protocol that enables endpoints to negotiate various session parameters, cipher parameters, cipher selection, or the like. In one or more of the various embodiments, applications may initialize session metadata by providing various parameters that encoding engines or decoding engines may use to manage the secure session. In some embodiments, session parameters may include, session durations, transaction limits, message package size limitations, keep-alive rules, expiry grace-time durations, or the like.

For example, an application may provide a data structure that includes the requested session parameters to an encoding engine. Accordingly, in this example, the encoding engine may generate an encoded handshake package that is based on the session parameters. The source application may communicate the handshake package to a target application. In this example, the target application may receive the handshake package and provide it to its decoding engine to obtain the session parameters selected or requested by the source application. Accordingly, in some embodiments, the target application may evaluate if the session parameters requested by the source application are acceptable. If so, in some embodiments, the target application may provide them or the encoded handshake package to its encoding engine. The encoding engine on the target application may generate a handshake response package that the target application may provide to the source application. Upon receipt of the handshake response package, the source application may provide it to its encoding engine. Accordingly, the encoding engine may confirm if the handshake response is sufficient to establish a secure session. If so, the encoding engine (or decoding engine) may generate session metadata based on the exchanged handshake packages. Thus, in one or more of the various embodiments, the application(s) may store the session metadata locally for generating message packages as described herein. Note, in one or more of the various embodiments, the number of handshake packages or handshake response packages exchanged between applications may vary depending on the handshake protocol being used. For example, in one or more of the various embodiments, a Diffie-Hellman compatible protocol may be performed to securely establish a symmetric cryptographic key for encoding application payloads into message packages or decoding message packages.

In one or more of the various embodiments, applications may be arranged to select a mechanism or method for communicating handshake packages or message packages to other applications. The particular method may be selected from one or more communication facilities, such as, one or more network interfaces, one or more network protocols, one or more inter-process communication methods (e.g., shared files, shared memory, sockets, or the like), message queues, store-and-forward pipelines, or the like. In some embodiments, two or more different communication facilities may be used to communicate handshake packages or message packages between applications. Likewise, in some embodiments, more than one communication facility may be used to communicate the handshake packages or message packages between applications. In some embodiments, one or more of the communication facilities may include Sneakernet, or user intervention to traverse an air gap. For example, one or more of the communication facilities may include copying a message package to a USB thumb drive which is then carried to another computer that picks up the message package from the USB thumb-drive and continues communicating the message package to its intended destination. In system 500, data transport 506 represents the combination of communication facilities that may be used to exchange message packages or handshake packages between applications.

Figure 6:
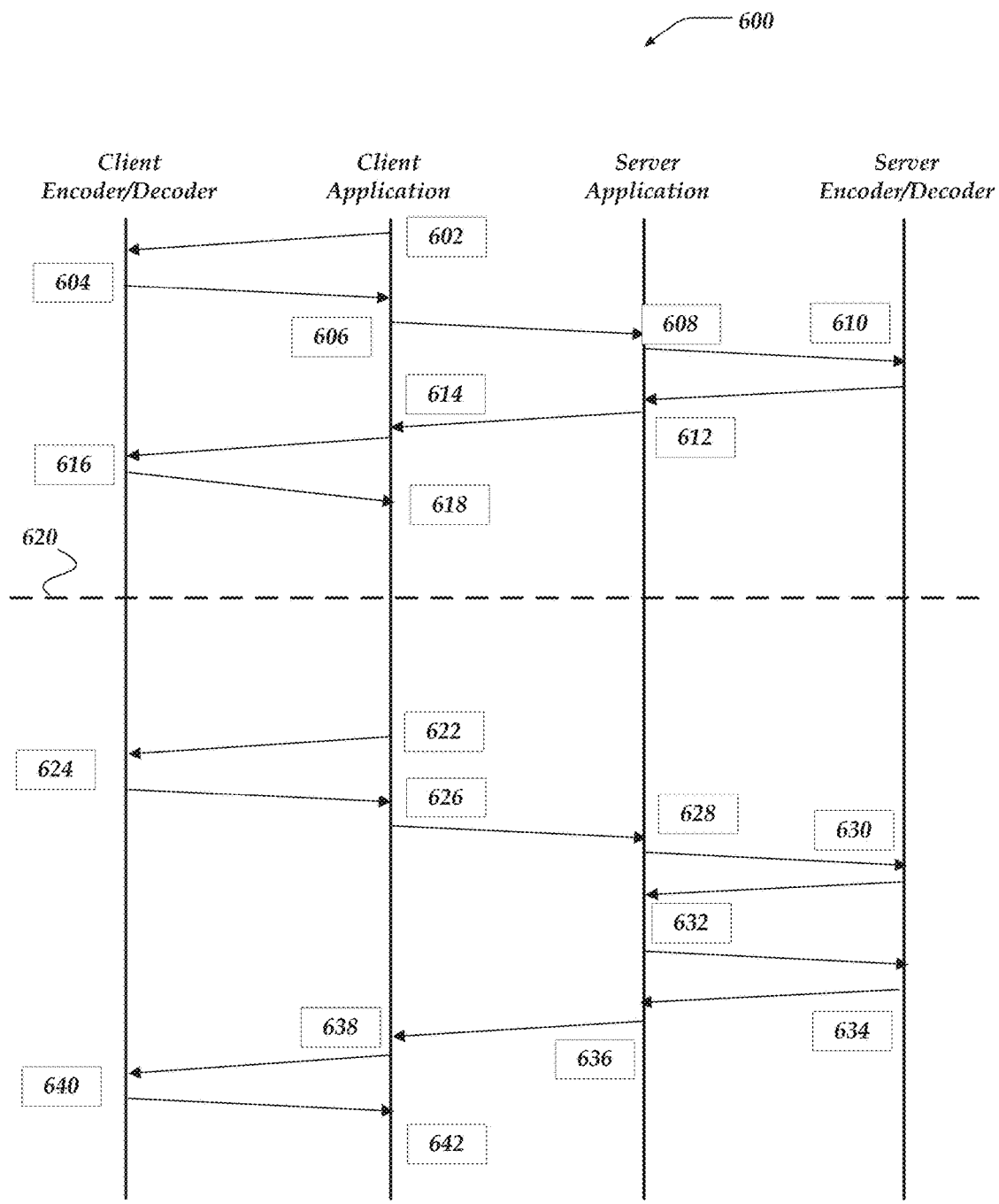
FIG. 6 is a sequence diagram that illustrates secure communications using unbounded sessions that is in accordance with one or more of the various embodiments.

FIG. 6 is a sequence diagram for sequence 600 that illustrates secure communications using unbounded sessions that is in accordance with one or more of the various embodiments.

At step 602, in one or more of the various embodiments, a client application may provide one or more session parameters to an encoding engine. As discussed above, the parameters may include values related to the type of secure session that client application requires. Also, in some embodiments, one or more parameters may be related to one or more cryptographic characteristics for the secure session that the client application requires or is requesting.

At step 604, in one or more of the various embodiments, the client's encoding engine may receive the session parameters and use them to generate a handshake package for establishing the session. In one or more of the various embodiments, the handshake package may be encoded using one or more well-known or custom cryptographic methods. Alternatively, in one or more embodiments, the handshake package may not be encoded using any cryptographic method and instead could be encoded using other algorithms or not encoded at all. In one or more of the various embodiments, the encoding engine may provide the handshake package to the client application.

At step 606, in one or more of the various embodiments, the client application may be responsible for communicating the handshake package to its intended server application. In one or more of the various embodiments, applications may be arranged to select a mechanism or method for communicating handshake packages or message packages to other applications.

At step 608, in one or more of the various embodiments, the server application may receive the handshake package. However, in some embodiments, because the handshake package may be encoded, the server application may be disabled from reading or decoding the handshake package directly. Accordingly, in some embodiments, the server application may be arranged to provide the handshake package to its decoding engine for further processing.

At step 610, in one or more of the various embodiments, the server's decoding engine receives the handshake package. In some embodiments, the decoding engine may decode the handshake package as necessary. In some embodiments, the decoding engine may be arranged to confirm that session parameters included in the handshake package are consistent with the secure session requirements of the server application.

Also, in one or more of the various embodiments, the decoding engine may be arranged to generate a handshake response package that may be generated based on the handshake package. The specific contents of the handshake response package may vary depending on the handshake protocols being used. For example, if the handshake protocol for establishing a secure session requires one or more secrets, keying information, cipher suite information, or the like, those values may be included in the handshake response package.

In one or more of the various embodiments, the protocol used for securing communication between the server application and the client application may not require a handshake response package. Accordingly, in one or more of the various embodiments, the handshake package provided by the client application may include sufficient information for establishing a secure session. Accordingly, in some embodiments, the decoding engine may generate session metadata that corresponds to the secure session rather than a handshake response package.

At step 612, in one or more of the various embodiments, the server's decoding engine may provide one or more session parameters to the server application. In some embodiments, these session parameters are decoded so the server application may compare them to its requirements or store one or more of the session parameter values for future reference.

Also, in one or more of the various embodiments, if the handshake protocol does not require a handshake response package, the decoding engine may be arranged to provide the session metadata information to the server application for future use. Note, in some embodiments, the decoding engine (also encoding engines) may be arranged to discard or otherwise disregard state information associated with secure sessions. Accordingly, in one or more of the various embodiments, the session metadata provided to the server application (or client application) may be arranged to include sufficient state information for maintaining or monitoring the secure session. For example, in some embodiments, if the server application discards the session metadata, the server application will be unable to obtain replacement session metadata from the decoding engine unless a new session with the client application is established via repeating the handshake protocol.

In one or more of the various embodiments, if the server's decoding engine provides a handshake response package to the server application, the server application may be arranged to communicate the handshake response package to the client application. In one or more of the various embodiments, the communication mechanism used to provide the handshake response package to the client application depends on how the server application and client application are configured to communicate with each other.

In one or more of the various embodiments, applications may be arranged to select a mechanism or method for communicating handshake packages or message packages to other applications.

At step 614, in one or more of the various embodiments, the client application may receive the handshake response package from the server application. In some embodiments, upon receiving the handshake response package, the client application may provide the handshake response package to its decoding engine.

In one or more of the various embodiments, the client application may be arranged to provide a copy of the handshake package it provided to the server. Also, in some embodiments, the client application may be arranged to provide one or more session parameters it may be holding that may be related to the pending handshake.

At step 616, in one or more of the various embodiments, the client application's decoding engine may be arranged to decode the handshake response package. Accordingly, in one or more of the various embodiments, the decoding engine may be arranged to decode or otherwise interpret the handshake response package to complete establishment of the session. In one or more of the various embodiments, the decoding engine may be arranged to employ the handshake response package and the initial handshake package to determine if the handshake with the server application is successful. Also, in one or more of the various embodiments, along with other handshake information, one or more session parameters provided by the client application may be used to confirm, evaluate, or authenticate some or all of the information included in the handshake response package.

In one or more of the various embodiments, if the handshake response package enables the secure session to be established, the decoding engine may generate session metadata information and provide it to the client application.

At step 618, in one or more of the various embodiments, the client application may receive the session metadata information from the decoding engine. Accordingly, in one or more of the various embodiments, the client application may be arranged to store the session metadata for use while performing secure communications via the new session.

Note, in one or more of the various embodiments, the client application and server application may exchange more than one handshake packages or handshake response packages depending on the particular handshake protocol being used. Also, in one or more of the various embodiments, additional handshake transactions may be required if the client application or server application (or their respective decoding engines or encoding engines) have to negotiate one or more session or cipher parameters. For example, if the client application is requesting to use a particular cipher, key size, expiry timeout, or the like, the server application may or may not be able to accept the requested terms. Accordingly, for example, the handshake response package provided by the server application may include "counter-offers" for the negotiated parameters. Thus, in some cases, additional handshake packages or handshake response packages may be exchanged until the client application and server application reach mutual agreement on the terms of the session. Likewise, in one or more of the various embodiments, if the client application and server application are unable to come to an agreement with respect to the characteristics of the impending secure session, the attempt to establish the secure session may fail.

At phase line 620, in one or more of the various embodiments, the handshake protocol performed by the client application and the server application may be considered to have completed successfully. Accordingly, in one or more of the various embodiments, the client application and server application have reached agreement regarding the terms of the secure session. At this point, in some embodiments, the client application will have its session metadata information for the secure session and the server application will have its session metadata information for the same session.

Also, in one or more of the various embodiments, either the client application or server application may maintain more than one secure session with the same or different client/server applications with different session metadata information for each secure session. Accordingly, in one or more of the various embodiments, client applications or server applications may be arranged to maintain or organize multiple sets of session metadata for each different secure sessions. In one or more of the various embodiments, client applications or server applications are responsible for providing or maintaining the data structures used to track session metadata for use with the one or more secure sessions they may be participating in.

Further, in one or more of the various embodiments, the network used to communicate between the client application and the server application may be intentionally or unintentionally disconnected at this point. Accordingly, in some embodiments, the secure session may resume at some later time when the network is reconnected. In some embodiments, the network can be reconnected using a different connection or different protocol than those used while establishing the secure session.

At step 622, in one or more of the various embodiments, the client application may prepare an application payload to communicate to the server application. In some embodiments, the content included in an application payload may be considered specific to the given applications. Accordingly, in some embodiments, the behavior of encoding engines or decoding engines or the secure session, in general, does not depend on the format or content of the application payload. Though, in some embodiments, there may be constraints related to the size of the application payload, session expiration timeout, one or more session parameters, or the like, or combination thereof.

In one or more of the various embodiments, the client application may provide the session metadata that corresponds to the secure session being used and the application payload to the encoding engine.

At step 624, in one or more of the various embodiments, the client's encoding engine may be provided the session metadata for the secure session and the application payload. In one or more of the various embodiments, the encoding engine may be arranged to generate a message package based on the application payload and the session metadata. In one or more of the various embodiments, the encoding engine may encode the message package based on the security protocol being used for the secure session. For example, in some embodiments, the handshake protocol (e.g., step 602 through step 618) may have included an exchange of secrets that enabled each side of the session to generate a symmetric key that may be used to encode the message package.

At step 626, in one or more of the various embodiments, the client's encoding engine may provide the message package to the client application. Accordingly, in one or more of the various embodiments, the client application may be arranged to communicate the message package to the server application. Also, in one or more of the various embodiments, the encoding engine may update the session metadata and provide the updated session metadata to the client application.

In one or more of the various embodiments, the encoding engine may be arranged to store session state information in the session metadata that may be related to enforcing one or more session parameters. For example, in some embodiments, the session parameters may have established a limit on the number of message packages the secure session may exchange before new keys are required. Accordingly, in this example, the session metadata may include information for tracking the number of message packages exchanged over the secure session.

Also, in one or more of the various embodiments, other metadata or metrics may be stored in the session metadata for a given secure session. This information may be used for diagnostics, usage monitoring, license enforcement, or the like.

At step 628, in one or more of the various embodiments, the client application may be arranged to provide the message package to the server application. In one or more of the various embodiments, applications may be arranged to select a mechanism or method for communicating handshake packages or message packages to other applications.

At step 628, in one or more of the various embodiments, the server application may be arranged to receive the message package. However, because the message package is encoded (by the client's encoding engine) the server application is unable to interpret the contents of the message package directly. Accordingly, in some embodiments, the server application may be arranged to provide the message package and the session metadata corresponding to the secure session to its decoding engine. Note, in one or more of the various embodiments, the session metadata provided to the server application's decoding engine is the session metadata that was generated and stored by the server application during the session handshake with the client application.

At step 630, in one or more of the various embodiments, the server's decoding engine may be provided the session metadata and the message package. Accordingly, in one or more of the various embodiments, the decoding engine may decode the message package to provide the application payload. The application payload may then be provided to the server application. Also, in some embodiments, the decoding engine may update the session metadata, if required, and return it to the server application.

At step 632, in one or more of the various embodiments, the server application receives the application payload and may generate a response application payload that it may provide to its encoding engine along with the session metadata for the secure session.

At step 634, in one or more of the various embodiments, the server's encoding engine may receive the response application payload and the session metadata from the server application. Accordingly, in some embodiments, the encoding engine may be arranged to encode the application payload to generate another message package. This message package may be returned to the server application. Also, in some embodiments, if the session metadata is updated by the encoding engine it may be returned to the server application.

At step 636, in one or more of the various embodiments, the server application has the other message package and may provide it to the client application. In one or more of the various embodiments, applications may be arranged to select a mechanism or method for communicating handshake packages or message packages to other applications.

At step 638, in one or more of the various embodiments, the client application receives the message package. Accordingly, in some embodiments, it may provide the message package and the session metadata to its decoding engine.

At step 640, in one or more of the various embodiments, the client's decoding engine may receive the message package and the session metadata. Accordingly, in one or more of the various embodiments, the decoding engine may decode the message package to generate the application payload for the client application.

At step 642, in one or more of the various embodiments, the client application may receive the application payload from its decoding engine. In this example, this application payload is the response application payload the server application generated in response to the application payload sent by the client application. Accordingly, in one or more of the various embodiments, the actions taken by client after receiving the response application payload from the server may depend on the nature of the applications that are using the secure session.

Note, this example, shows that the server application provides an application payload in response to receiving the application payload from the client application. Whether this happens or not depends on the nature of the applications comprising the client application and the server application. The decoding engines or encoding engines generate message packages to exchange over the secure session without concern for the purpose or contents of the application payloads.

Generalized Operations

FIGS. 7-11 represent generalized operations for unbounded sessions for secure communications in accordance with one or more of the various embodiments. In one or more of the various embodiments, processes 700, 800, 900, 1000, and 1100 described in conjunction with FIGS. 7-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-11 may be used for unbounded sessions for secure communications in accordance with at least one of the various embodiments or architectures such as those described in conjunction with FIGS. 4-6. Further, in one or more of the various embodiments, some or all of the actions performed by processes 700, 800, 900, 1000, and 1100 may be executed in part by encoding engine 322 or decoding engine 324 running on one or more processors of one or more network computers.

Figure 7:
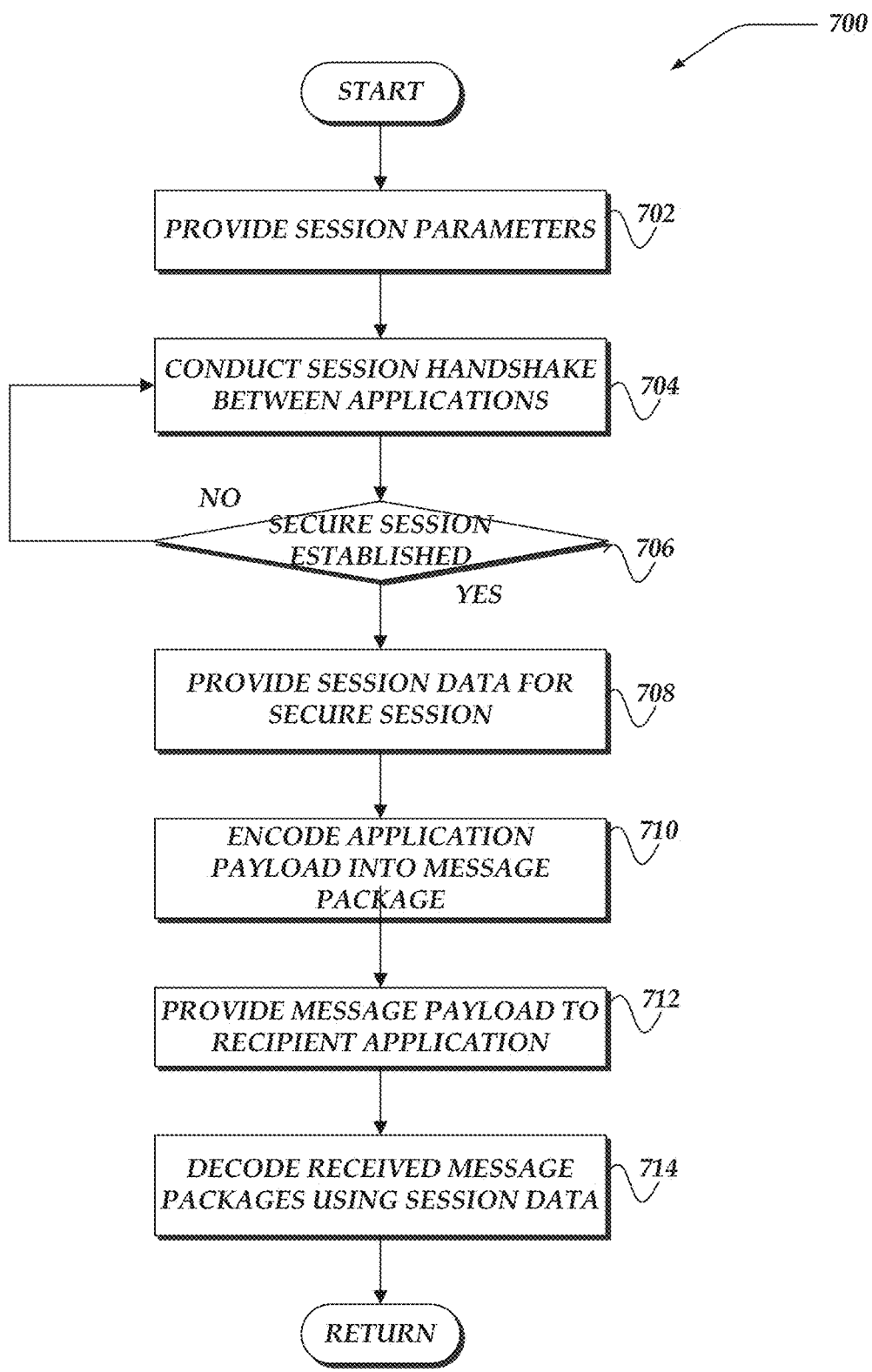
FIG. 7 illustrates an overview flowchart of a process for unbounded sessions for secure communications in accordance with one or more of the various embodiments.

FIG. 7 illustrates an overview flowchart of process 700 for unbounded sessions for secure communications in accordance with one or more of the various embodiments. After a start block, at block 702, in one or more of the various embodiments, session parameters for an impending secure session may be provided. In one or more of the various embodiments, session parameters may be provided via configuration information, user input, or the like.

In one or more of the various embodiments, session parameter values may include, session timeout/duration, exchange count limits, message size limits, message rate limits, cipher suite selection, key size constraints, pass phrase information, other secrets, or the like.

In one or more of the various embodiments, an application may provide the session parameters to its encoding engine or decoding engine. In some embodiments, the session parameters may be provided via an API that enables applications to provide one or more session parameters to their encoding engine or decoding engine.

At block 704, in one or more of the various embodiments, a session handshake may be conducted between applications (e.g., a client application and a server application) that intend to establish a secure session for secure communication with each other. In one or more of the various embodiments, applications may be arranged to select one or more communication facilities for communicating handshake packages to other applications.

At decision block 706, in one or more of the various embodiments, if a secure session is successfully established, control may flow to block 708; otherwise, control may loop back to block 704. Note, in one or more of the various embodiments, control may loop back to block 704 if the endpoints are continuing to exchange handshake packages while performing the handshake protocol. At some point, in some embodiments, either endpoint may give up on the handshake and abandon the attempt to establish a secure session which may return control to a calling process.

At block 708, in one or more of the various embodiments, because the handshake was completed successfully, session metadata may be provided by the decoding engine or encoding engine to the applications participating in the secure session. As discussed above, in some embodiments, it may be the responsibility of the applications to maintain control of the session metadata corresponding to the secure session they are using.

At block 710, in one or more of the various embodiments, an application may instantiate an encoding engine to encode an application payload into a message package. In one or more of the various embodiments, the encoding engine may employ the session metadata when encoding the application payload into a message package. In some embodiments, one application payload may be encoded into two or more message packages depending on the session parameters for the secure session.

At block 712, in one or more of the various embodiments, applications may provide the message packages to a recipient application. For example, as described above, a client application may use its encoding engine to provide a message package that the client application then communicates to a server application. In one or more of the various embodiments, applications may be arranged to select one or more communication facilities for communicating handshake packages or message packages to other applications.

At block 714, in one or more of the various embodiments, applications may be provided one or more message packages that they may employ their decoding engines to decode back into an application payload. In one or more of the various embodiments, the applications may receive message packages over various communication paths or protocols. Accordingly, in one or more of the various embodiments, if message packages are received, an application may provide the message packages to a decoding engine along with the session metadata that corresponds to the secure session associated with a given message package. The decoding engine may decode the message packages to provide application payloads that may be provided back to the application.

Next, control may be returned to a calling process.

Figure 8:
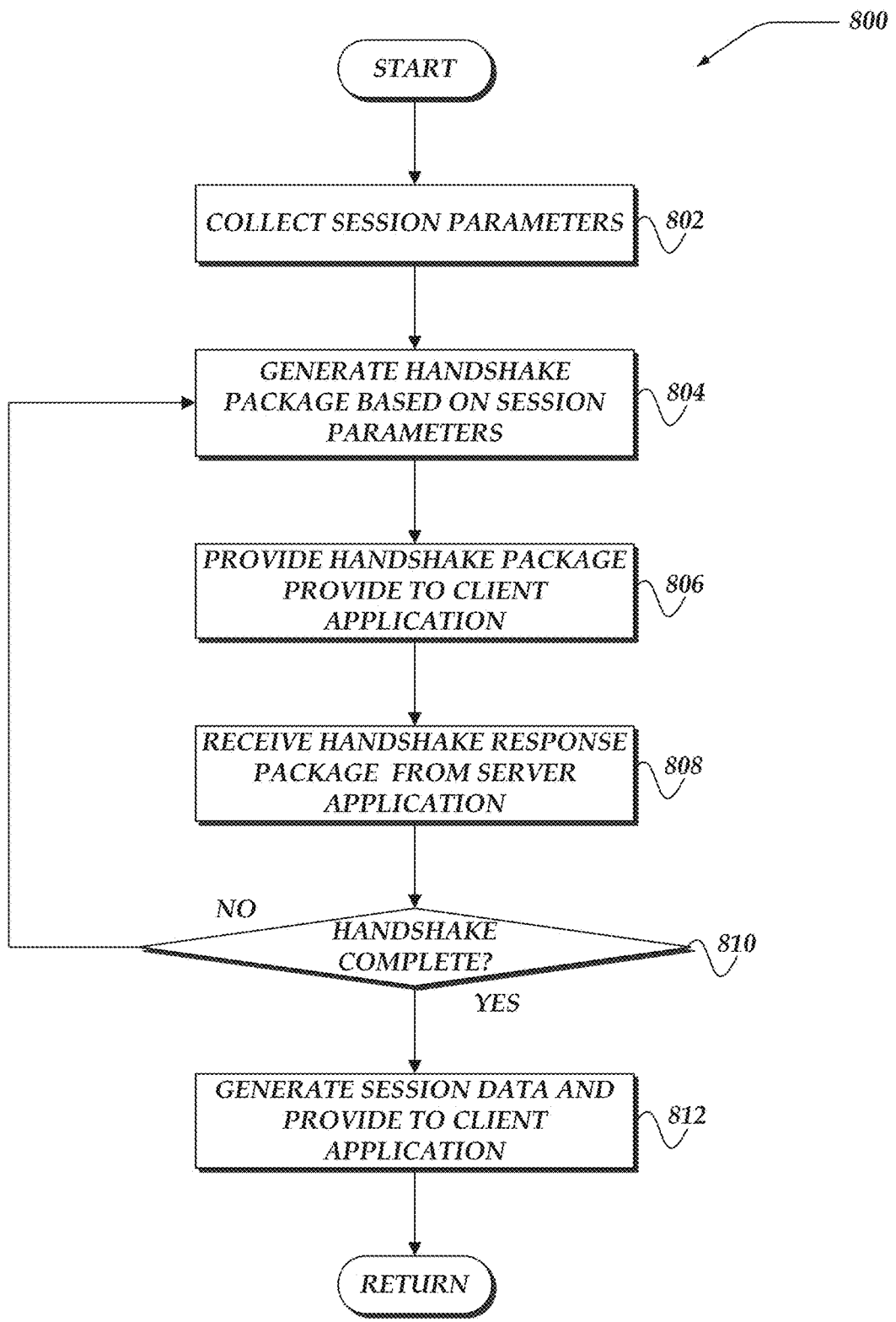
FIG. 8 illustrates a flowchart for a process for performing the sender side of a handshake protocol to establish a secure session in accordance with one or more of the various embodiments.

FIG. 8 illustrates a flowchart for process 800 for performing the sender of a handshake protocol to establish a secure session in accordance with one or more of the various embodiments. After a start block, at block 802, in one or more of the various embodiments, an encoding engine may collect session parameters for the impending secure session. The session parameters may be provided via built-in default values, configuration information, user input, or the like, or combination thereof.

At block 804, in one or more of the various embodiments, a handshake package may be generated based on the session parameters. In one or more of the various embodiments, an encoding engine may be arranged to generate a handshake package based on the session parameters.

At block 806, in one or more of the various embodiments, the client application may send the handshake package to the server application. In one or more of the various embodiments, applications may be arranged to select one or more communication facilities for communicating handshake packages or message packages to other applications.

At block 808, in one or more of the various embodiments, the client application may receive a handshake response package from the server application. In one or more of the various embodiments, the handshake response package may be provided to a decoding engine for validation or interpretation. In one or more of the various embodiments, applications may be arranged to select one or more communication facilities for communicating handshake packages or message packages to other applications.

At decision block 810, in one or more of the various embodiments, if the handshake is successfully completed, control may flow to block 812; otherwise, control may loop back to block 804 to continue the handshake protocol. Note, in some embodiments, either endpoint of the impending session may determine that the handshake has failed and cause the attempt to establish a secure session to terminate. The conditions for determining failure to establish a connection may be determined based on session parameters, or the like. For example, in some embodiments, the session parameters may define one or more values, such as, a maximum number of retries, time-out value, or the like, that may be used to determine if an attempt to establish a secure session may be terminated or otherwise abandoned.

At block 812, in one or more of the various embodiments, at the completion of a successful handshake, encoding engines or decoding engines may be arranged to generate session metadata that corresponds to the secure session and provide it to the applications. In one or more of the various embodiments, the client application's encoding engine or decoding engine may generate session metadata that the client application may store for use with the secure session. Likewise, the server application's encoding engine or decoding engine may generate session metadata that the server application may store for use with the secure session.

Next, control may be returned to a calling process.

Figure 9:
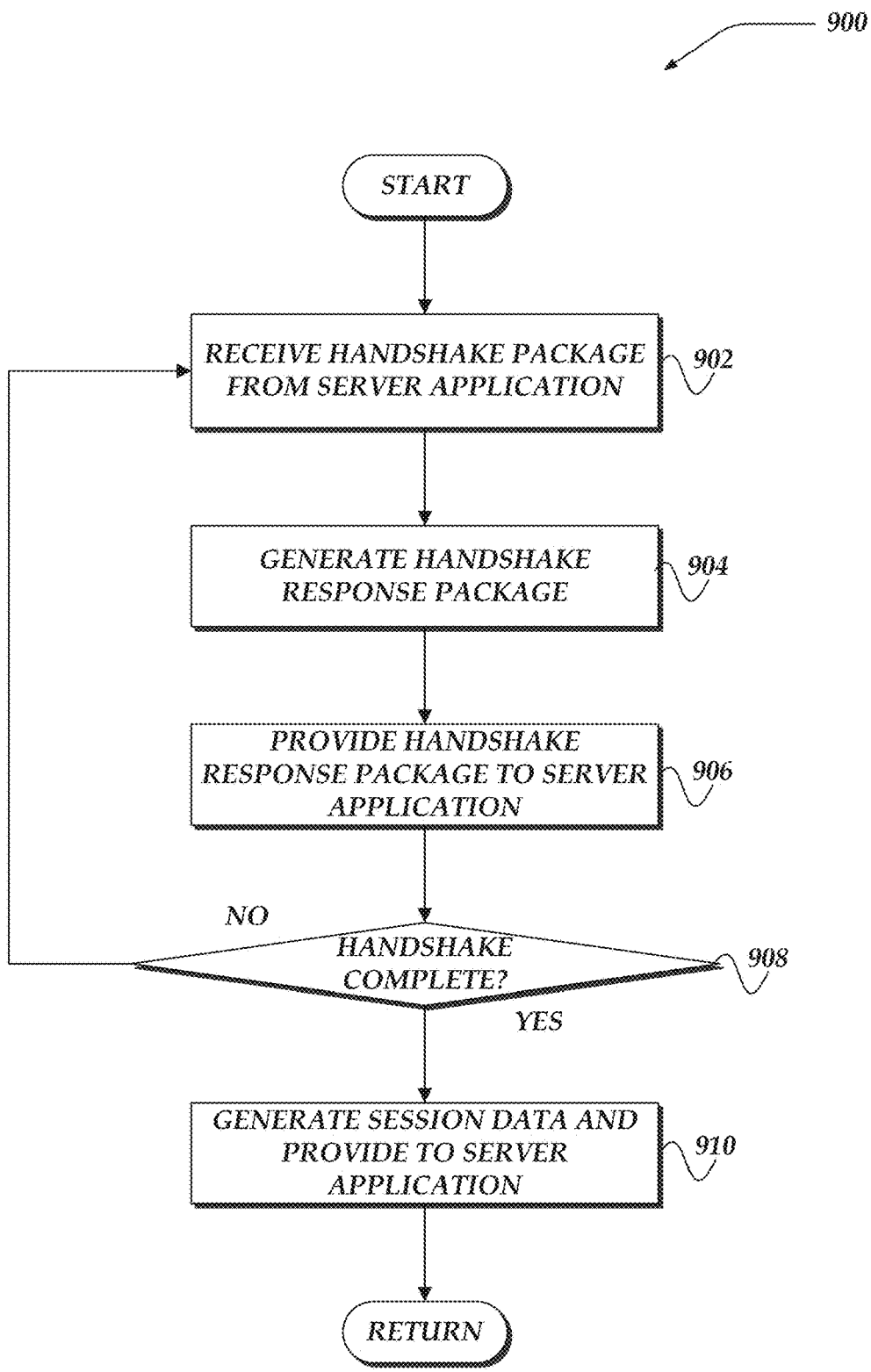
FIG. 9 illustrates a flowchart for a process for performing the receiver side of a handshake protocol to establish a secure session in accordance with one or more of the various embodiments.

FIG. 9 illustrates a flowchart for process 900 for performing the receiver side of a handshake protocol to establish a secure session in accordance with one or more of the various embodiments. After a start block, at block 902, in one or more of the various embodiments, a server application may provide a handshake package to its decoding engine. In one or more of the various embodiments, the server application may receive a handshake package from a client application that the server application may provide to its decoding engine.

At block 904, in one or more of the various embodiments, the decoding engine may generate a handshake response package. In one or more of the various embodiments, a decoding engine may be arranged to perform one or more actions to validate the handshake package or confirm that the session parameters requested in the handshake package are compatible with the requirements of the server application. If the handshake package is accepted, the decoding engine may generate a handshake response package that corresponds with the provided handshake package.

At block 906, in one or more of the various embodiments, the decoding engine may provide the handshake response package to the server application. Accordingly, in one or more of the various embodiments, the server application may be responsible for communicating the handshake response package to the client application that may be associated with the handshake package. In one or more of the various embodiments, applications may be arranged to select one or more communication facilities for communicating handshake packages or message packages to other applications.

At decision block 908, in one or more of the various embodiments, if the handshake is complete, control may flow to block 910; otherwise, control may loop back to block 902 to continue the handshake protocol activity. Note, in some embodiments, either endpoint of the impending session may determine that the handshake has failed and cause the attempt to establish a secure session to terminate. The conditions for determining failure to establish a connection may be determined based on session parameters, or the like.

At block 910, in one or more of the various embodiments, the decoding engine used by the server application may generate the session metadata for the secure session and provide it to the server application for use with the newly established secure session.

Next, control may be returned to a calling process.

Figure 10:
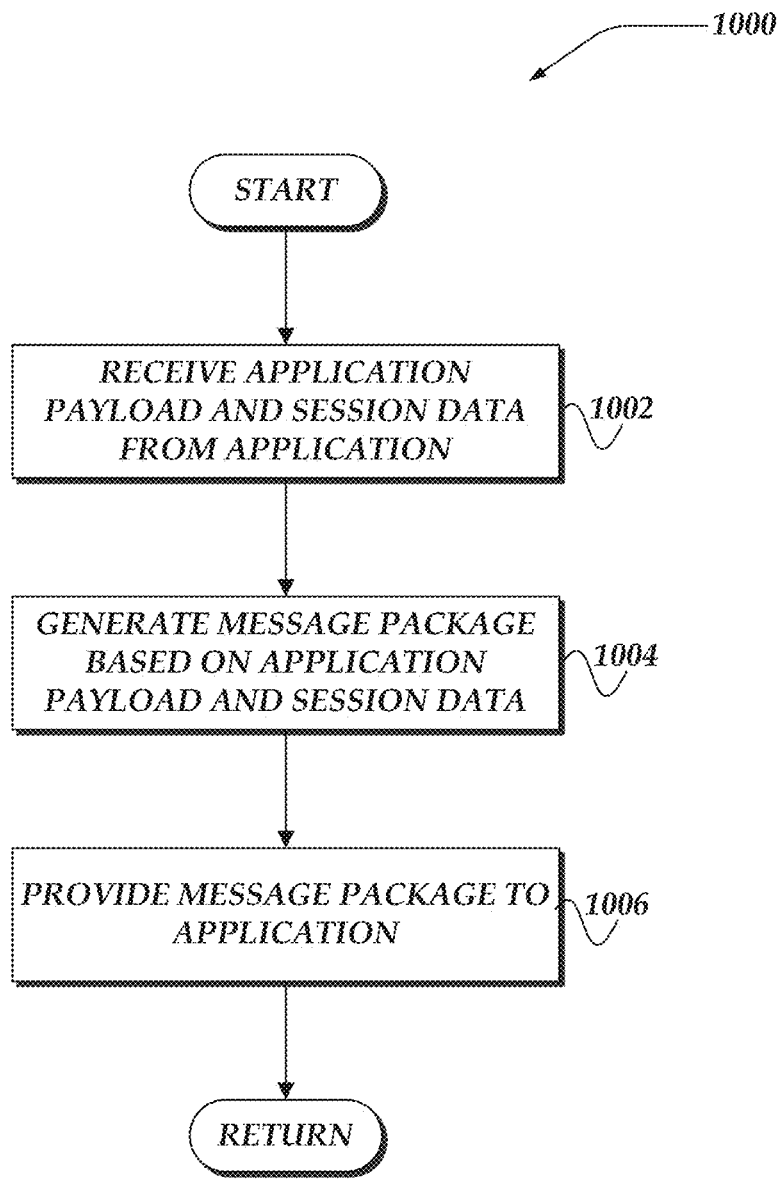
FIG. 10 illustrates a flowchart for a process for generating a message package for a secure session in accordance with one or more of the various embodiments.

FIG. 10 illustrates a flowchart for process 1000 for generating a message package for a secure session in accordance with one or more of the various embodiments. After a start block, at block 1002, in one or more of the various embodiments, an encoding engine may be provided an application payload and session metadata from an application. In one or more of the various embodiments, the session metadata may correspond to a particular secure session that the application is aware of. Accordingly, in some embodiments, different secure sessions used by the same application each have separate session metadata.

At block 1004, in one or more of the various embodiments, the encoding engine may be arranged to generate a message package from the application payload and the session metadata. For example, in one or more of the various embodiments, if the secure session uses cryptographic keys, they may be used to encode the application payload into a message package. Note, the message package may include one or more metadata values required by the protocol used by the encoding engines or decoding engines. For example, in one or more of the various embodiments, message packages may include meta-data, such as, checksums, hash based digests, one or more flags (e.g., compressed, uncompressed, verbatim, or the like), payload size values, or the like, that may be used to confirm if a message package is decoded successfully into the application payload.

Accordingly, in one or more of the various embodiments, the encoding engine may be arranged to compute a checksum or hash key from original application payload data. Accordingly, it may include the computed checksum or hash key in a field in the message package so decoding engines may confirm if the message package is decoded properly. In other embodiments, validating the application payload may be left to the applications. For example, the applications may be arranged to include checksum, hash digests, or the like, in the application payload before providing the application payload to an encoding engine for encoding into a message package. Thus, in one or more of the various embodiments, the application at the other end of the secure session may validate the application payload using the checksum or hash digests after the decoding engine decodes the message package back to the application payload.

At block 1006, in one or more of the various embodiments, the encoding engine may provide the message package to the application. In one or more of the various embodiments, the application may be responsible for determining the next steps for the message package. In one or more of the various embodiments, applications may be arranged to select one or more communication facilities for communicating handshake packages or message packages to other applications. For example, the application may open a TCP/IP connection to another application and use that network connection to send the message package to the other application.

Next, control may be returned to a calling process.

Figure 11:
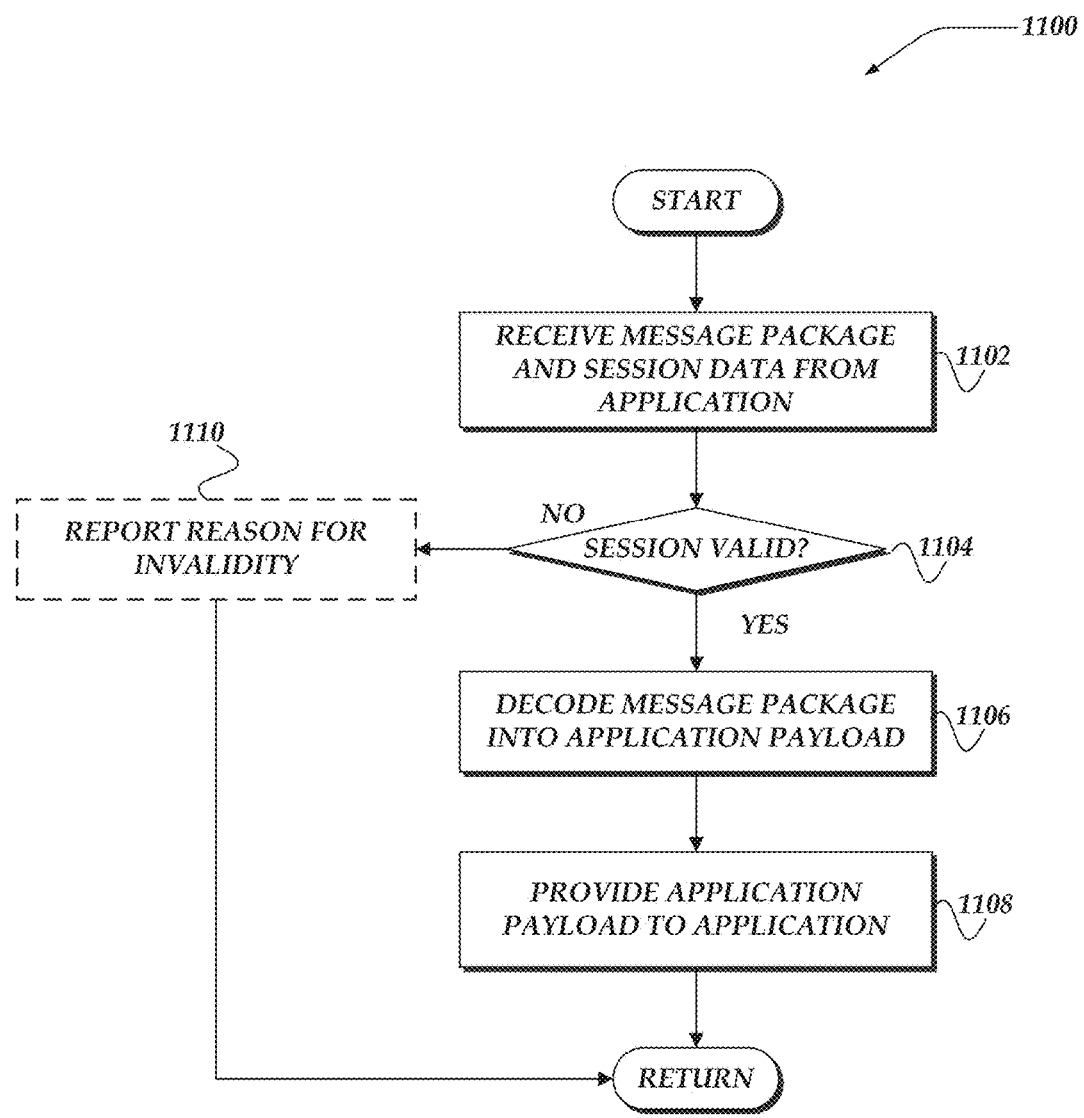
FIG. 11 illustrates a flowchart for a process for generating an application payload from a message package in accordance with one or more of the various embodiments.

FIG. 11 illustrates a flowchart for process 1100 for generating an application payload from a message package in accordance with one or more of the various embodiments. After a start block, at block 1102, in one or more of the various embodiments, a decoding engine may be provided a message package and session metadata from an application. In one or more of the various embodiments, the session metadata may correspond to a secure session being used by the application to securely communicate with another application. In one or more of the various embodiments, the application may be assumed to maintain the data structures or perform actions necessary for correctly associating the message package, session metadata, and the secure session. For example, the application may be arranged to maintain a data structure that maps network connections to secure sessions. Accordingly, in one or more of the various embodiments, message packages received over a particular network connection may be mapped to a particular secure session and its corresponding session metadata.

In one or more of the various embodiments, applications may be arranged to select one or more communication facilities for communicating handshake packages or message packages to other applications.

At decision block 1104, in one or more of the various embodiments, if the secure session is valid, control may flow to block 1106; otherwise, control may flow block 1110. As described above, the decoding engine may compare the message package, session metadata, or the like, to one or more validity conditions defined by the session parameters. For example, a secure session may be invalid if it has expired.

At block 1106, in one or more of the various embodiments, the decoding engine may be arranged to decode the message package into the application payload.

At block 1108, in one or more of the various embodiments, the decoding engine may provide the application payload to the applications. Accordingly, in one or more of the various embodiments, the application may proceed based on the application payload. For example, in one or more of the various embodiments, the application payload may be a database query. Accordingly, in this example, the application may execute the query to generate a result set. Then, depending on the application, some or all of the result set may be encoded into a message package and provided to another application. Alternatively, in some embodiments, in this example, the application may simply use the result set internally, or communicate it to another destination without using the secure session or perhaps encode it into a message package for use with another secure session.

In one or more of the various embodiments, applications may be arranged to select one or more communication facilities for communicating handshake packages or message packages to other applications. Next, control may be returned to a calling process.

At block 1110, in one or more of the various embodiments, optionally, because the application attempted to use an invalid session, the decoding engine may be arranged to report a reason why the session may be invalid. In one or more of the various embodiments, the reporting may include one or more various actions, such as, logging one or more properties of the invalidity event, notifying the application (e.g., via callbacks, local messages/events, return values, or the like), sending an electronic notification to one or more users, or the like, or combination thereof. Next, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), resource-constrained or Internetof-Things (IoT) device, or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for encoding data over one or more networks or communications mechanisms using one or more processors of a network computer that execute instructions to perform the method, comprising:
   instantiating a first application to perform actions, including:
      generating a payload that includes information associated with the first application and a second application; and
   instantiating an encoding engine to perform actions, including:
      obtaining a first session bundle and the payload from the first application, wherein the first session bundle corresponds to a secure session;
      generating a message package that includes an encoded version of the payload, wherein the payload is encoded based on the first session bundle and the payload; and
      providing the message package to the first application; and
   selecting one or more of a plurality of communication facilities available to the first application to send the message package to the second application, wherein two or more types of the communication facilities provide different modes of communication over different types of communication media, and wherein the different modes of communication include one or more manual actions that are performed with the message package to manually traverse one or more physical air gaps between two or more networks and to enable the secure session to continue communicating the message package to the second application on the one or more networks; and
   instantiating the second application to perform actions, including:
      employing one or more of the plurality of communication facilities that are available to the second application to receive the message package from the first application; and
   instantiating a decoding engine to perform actions, including:
      decoding the message package based on a second session bundle that is associated with the secure session, wherein state information associated with the secure session is discarded; and
      providing the payload of the decoded message package without the state information for the secure session to the second application.

2. The method of claim 1, wherein the first application performs further actions, including:
   providing one or more session parameters to the encoding engine;
   obtaining a handshake package from the encoding engine, wherein the handshake package is based on one or more session parameters;
   selecting the one or more communication facility from the plurality of communication facilities; and
   employing the one or more communication facility to send the handshake package to the second application.

3. The method of claim 1, wherein the second application performs further actions, including:
   obtaining a handshake package from the first application;
   providing the handshake package to the decoding engine;
   receiving a response handshake package and the second session bundle from the decoding engine, wherein the response handshake package and the second session bundle are based on the handshake package and one or more session parameters;
   selecting the one or more communication facilities available to the second application from the plurality of communication facilities; and
   employing the one or more communication facilities available to the second application to send the response handshake package to the first application.

4. The method of claim 1, wherein the first application performs further actions, including:
   obtaining a response handshake package from the second application;
   providing the response handshake package to the encoding engine; and
   receiving the first session bundle from the encoding engine, wherein the first session bundle is based on the response handshake package and one or more session parameters.

5. The method of claim 1, wherein the second application performs further actions, including:
   providing one or more second session parameters;
   obtaining one or more first session parameters from the decoding engine based on a handshake package provided by the first application;
   comparing the one or more first session parameters to the one or more second session parameters; and
   accepting the handshake package based on an affirmative result of the comparison.

6. The method of claim 1, wherein the decoding engine performs further actions, including:
   comparing the message package with the second session bundle; and
   rejecting the message package based on a negative result of the comparison, wherein the payload is discarded and the secure session is terminated.

7. The method of claim 1, wherein receiving the message package from the first application, further comprises, introducing one or more of a delay, a communication interruption, or a network interruption before receiving the message package, wherein the delay, communication interruption, or the network interruption is of an unbounded duration.

8. The method of claim 1, wherein receiving the message package from the first application, further comprises, selecting a communication facility that is different from the one or more communication facilities employed to establish the secure session or communicate other message packages between the first application and the second application.

9. A processor readable non-transitory storage media that includes instructions for encoding data over one or more networks or communications mechanisms using one or more computers, wherein execution of the instructions by the one or more network computers perform the method comprising:
   instantiating a first application to perform actions, including:

generating a payload that includes information associated with the first application and a second application; and instantiating an encoding engine to perform actions, including:

obtaining a first session bundle and the payload from the first application, wherein the first session bundle corresponds to a secure session;

generating a message package that includes an encoded version of the payload, wherein the payload is encoded based on the first session bundle and the payload; and providing the message package to the first application; and selecting one or more of a plurality of communication facilities available to the first application to send the message package to the second application, wherein two or more types of the communication facilities provide different modes of communication over different types of communication media, and wherein the different modes of communication include one or more manual actions that are performed with the message package to manually traverse one or more physical air gaps between two or more networks and to enable the secure session to continue communicating the message package to the second application on the one or more networks; and instantiating the second application to perform actions, including:

employing one or more of the plurality of communication facilities that are available to the second application to receive the message package from the first application; and instantiating a decoding engine to perform actions, including:

decoding the message package based on a second session bundle that is associated with the secure session, wherein state information associated with the secure session is discarded; and providing the payload of the decoded message package without the state information for the secure session to the second application.

10. The media of claim 9, wherein the first application performs further actions, including:

providing one or more session parameters to the encoding engine;

obtaining a handshake package from the encoding engine, wherein the handshake package is based on one or more session parameters;

selecting the one or more communication facility from the plurality of communication facilities; and employing the one or more communication facility to send the handshake package to the second application.

11. The media of claim 9, wherein the second application performs further actions, including:

obtaining a handshake package from the first application;

providing the handshake package to the decoding engine;

receiving a response handshake package and the second session bundle from the decoding engine, wherein the response handshake package and the second session bundle are based on the handshake package and one or more session parameters;

selecting the one or more communication facilities available to the second application from the plurality of communication facilities; and employing the one or more communication facilities available to the second application to send the response handshake package to the first application.

12. The media of claim 9, wherein the first application performs further actions, including:

obtaining a response handshake package from the second application;

providing the response handshake package to the encoding engine; and receiving the first session bundle from the encoding engine, wherein the first session bundle is based on the response handshake package and one or more session parameters.

13. The media of claim 9, wherein the second application performs further actions, including:

providing one or more second session parameters;

obtaining one or more first session parameters from the decoding engine based on a handshake package provided by the first application;

comparing the one or more first session parameters to the one or more second session parameters; and accepting the handshake package based on an affirmative result of the comparison.

14. The media of claim 9, wherein the decoding engine performs further actions, including:

comparing the message package with the second session bundle; and rejecting the message package based on a negative result of the comparison, wherein the payload is discarded and the secure session is terminated.

15. The media of claim 9, wherein receiving the message package from the first application, further comprises, introducing one or more of a delay, a communication interruption, or a network interruption before receiving the message package, wherein the delay, communication interruption, or the network interruption is of an unbounded duration.

16. The media of claim 9, wherein receiving the message package from the first application, further comprises, selecting a communication facility that is different from the one or more communication facilities employed to establish the secure session or communicate other message packages between the first application and the second application.

17. A system for encoding data, comprising:

one or more network computers, comprising:

a transceiver that communicates over one or more networks;

a memory that stores at least instructions; and one or more processors that execute instructions that perform actions, including:

instantiating a first application to perform actions, including:

generating a payload that includes information associated with the first application and a second application; and instantiating an encoding engine to perform actions, including:

obtaining a first session bundle and the payload from the first application, wherein the first session bundle corresponds to a secure session;

generating a message package that includes an encoded version of the payload, wherein the payload is encoded based on the first session bundle and the payload; and providing the message package to the first application; and selecting one or more of a plurality of communication facilities available to the first application to send the message package to the second application, wherein two or more types of the communication facilities provide different modes of communication over different types of communication media, and wherein the different modes of communication include one or more manual actions that are performed with the message package to manually traverse one or more physical air gaps between two or more networks and to enable the secure session to continue communicating the message package to the second application on the one or more networks; and one or more client computers, comprising:
a transceiver that communicates over the one or more networks;
a memory that stores at least instructions; and
one or more processors that execute instructions that perform actions, including:
instantiating the second application to perform actions, including:
employing one or more of the plurality of communication facilities that are available to the second application to receive the message package from the first application; and
instantiating a decoding engine to perform actions, including:
decoding the message package based on a second session bundle that is associated with the secure session, wherein state information associated with the secure session is discarded; and
providing the payload of the decoded message package without the state information for the secure session to the second application.

18. The system of claim 17, wherein the first application performs further actions, including:
providing one or more session parameters to the encoding engine;
obtaining a handshake package from the encoding engine, wherein the handshake package is based on one or more session parameters;
selecting the one or more communication facility from the plurality of communication facilities; and
employing the one or more communication facility to send the handshake package to the second application.

19. The system of claim 17, wherein the second application performs further actions, including:
obtaining a handshake package from the first application;
providing the handshake package to the decoding engine;
receiving a response handshake package and the second session bundle from the decoding engine, wherein the response handshake package and the second session bundle are based on the handshake package and one or more session parameters;
selecting the one or more communication facilities available to the second application from the plurality of communication facilities; and
employing the one or more communication facilities available to the second application to send the response handshake package to the first application.

20. The system of claim 17, wherein the first application performs further actions, including:
obtaining a response handshake package from the second application;
providing the response handshake package to the encoding engine; and
receiving the first session bundle from the encoding engine, wherein the first session bundle is based on the response handshake package and one or more session parameters.

21. The system of claim 17, wherein the second application performs further actions, including:
providing one or more second session parameters;
obtaining one or more first session parameters from the decoding engine based on a handshake package provided by the first application;
comparing the one or more first session parameters to the one or more second session parameters; and
accepting the handshake package based on an affirmative result of the comparison.

22. The system of claim 17, wherein the decoding engine performs further actions, including:
comparing the message package with the second session bundle; and
rejecting the message package based on a negative result of the comparison, wherein the payload is discarded and the secure session is terminated.

23. The system of claim 17, wherein receiving the message package from the first application, further comprises, introducing one or more of a delay, a communication interruption, or a network interruption before receiving the message package, wherein the delay, communication interruption, or the network interruption is of an unbounded duration.

24. A network computer for encoding data, comprising:
a transceiver that communicates over a network;
a memory that stores at least instructions; and
one or more processors that execute instructions that perform actions, including:
instantiating a first application to perform actions, including:
generating a payload that includes information associated with the first application and a second application; and
instantiating an encoding engine to perform actions, including:
obtaining a first session bundle and the payload from the first application, wherein the first session bundle corresponds to a secure session;
generating a message package that includes an encoded version of the payload, wherein the payload is encoded based on the first session bundle and the payload; and
providing the message package to the first application; and
selecting one or more of a plurality of communication facilities available to the first application to send the message package to the second application, wherein two or more types of the communication facilities provide different modes of communication over different types of communication media, and wherein the different modes of communication include one or more manual actions that are performed with the message package to manually traverse one or more physical air gaps between two or more networks and to enable the secure session to continue communicating the message package to the second application on the one or more networks; and instantiating the second application to perform actions, including:

employing one or more of the plurality of communication facilities that are available to the second application to receive the message package from the first application; and instantiating a decoding engine to perform actions, including:

decoding the message package based on a second session bundle that is associated with the secure session, wherein state information associated with the secure session is discarded; and providing the payload of the decoded message package without the state information for the secure session to the second application.

25. The network computer of claim 24, wherein the first application performs further actions, including:

providing one or more session parameters to the encoding engine;

obtaining a handshake package from the encoding engine, wherein the handshake package is based on one or more session parameters;

selecting the one or more communication facility from the plurality of communication facilities; and employing the one or more communication facility to send the handshake package to the second application.

26. The network computer of claim 24, wherein the second application performs further actions, including:

obtaining a handshake package from the first application;

providing the handshake package to the decoding engine;

receiving a response handshake package and the second session bundle from the decoding engine, wherein the response handshake package and the second session bundle are based on the handshake package and one or more session parameters;

selecting the one or more communication facilities available to the second application from the plurality of communication facilities; and employing the one or more communication facilities available to the second application to send the response handshake package to the first application.

27. The network computer of claim 24, wherein the first application performs further actions, including:

obtaining a response handshake package from the second application;

providing the response handshake package to the encoding engine; and receiving the first session bundle from the encoding engine, wherein the first session bundle is based on the response handshake package and one or more session parameters.

28. The network computer of claim 24, wherein the second application performs further actions, including:

providing one or more second session parameters;

obtaining one or more first session parameters from the decoding engine based on a handshake package provided by the first application;

comparing the one or more first session parameters to the one or more second session parameters; and accepting the handshake package based on an affirmative result of the comparison.

29. The network computer of claim 24, wherein the decoding engine performs further actions, including:

comparing the message package with the second session bundle; and rejecting the message package based on a negative result of the comparison, wherein the payload is discarded and the secure session is terminated.

30. The network computer of claim 24, wherein receiving the message package from the first application, further comprises, selecting a communication facility that is different from the one or more communication facilities employed to establish the secure session or communicate other message packages between the first application and the second application.

* * * * *